United States Patent
Takata et al.

(10) Patent No.: US 8,081,758 B2
(45) Date of Patent: Dec. 20, 2011

(54) COMMUNICATION SUPPORT SERVER, COMMUNICATION SUPPORT METHOD, AND COMMUNICATION SUPPORT SYSTEM

(75) Inventors: Osamu Takata, Tokyo (JP); Takahiro Fujishiro, Yokohama (JP); Tadashi Kaji, Yokohama (JP); Kazuyoshi Hoshino, Komae (JP)

(73) Assignee: Hitachi, Ltd., Tokyo (JP)

( * ) Notice: Subject to any disclaimer, the term of this patent is extended or adjusted under 35 U.S.C. 154(b) by 1396 days.

(21) Appl. No.: 11/317,003

(22) Filed: Dec. 27, 2005

(65) Prior Publication Data

US 2007/0192583 A1    Aug. 16, 2007

(30) Foreign Application Priority Data

Dec. 28, 2004  (JP) ................................ 2004-379775

(51) Int. Cl.
*H04K 1/00*       (2006.01)
(52) U.S. Cl. ........ 380/255; 380/277; 380/279; 713/168; 713/171
(58) Field of Classification Search .......... 713/168–171, 713/150; 380/277–286, 255
See application file for complete search history.

(56) References Cited

U.S. PATENT DOCUMENTS

| | | | |
|---|---|---|---|
| 5,325,432 A * | 6/1994 | Gardeck et al. | 380/273 |
| 6,976,176 B1 * | 12/2005 | Schier | 726/11 |
| 7,143,436 B2 * | 11/2006 | Yamaguchi et al. | 726/6 |
| 2005/0097314 A1 * | 5/2005 | Matsushima | 713/156 |
| 2006/0036733 A1 * | 2/2006 | Fujimoto et al. | 709/225 |
| 2006/0123077 A1 * | 6/2006 | Munetsugu et al. | 709/203 |

FOREIGN PATENT DOCUMENTS

| | | |
|---|---|---|
| JP | 63-161745 | 7/1988 |
| JP | 2003-032236 | 1/2003 |
| JP | 2003-101533 | 4/2003 |
| JP | 2003-179592 | 6/2003 |
| JP | 2003-244123 | 8/2003 |
| JP | 2004-056628 | 2/2004 |
| JP | 2004-080512 | 3/2004 |
| JP | 2004-159100 | 6/2004 |
| JP | 2004-253967 | 9/2004 |
| JP | 2005-160005 | 6/2005 |
| JP | 2005-303485 | 10/2005 |

OTHER PUBLICATIONS

Mark Baugher et al. "MSEC Group Key Management Architecture, <draft-ietf-msec-gkmarch-07.txt>", IETF (Internet Engineering Task Force), p. 3-13, http//www.ietf.org/internet-drafts-ietf-msec-gkmarch-07.txt, Jan. 30, 2003.

* cited by examiner

*Primary Examiner* — Kimyen Vu
*Assistant Examiner* — Chi Nguy
(74) *Attorney, Agent, or Firm* — Antonelli, Terry, Stout & Kraus, LLP.

(57) ABSTRACT

When a cryptographic communicating part 208 of the communication support server 20 exchanges information with the information processing units 14, if the term of validity of a first key stored in a cryptographic key storing part 200 and corresponding to the identification information of the information processing unit 14 does not expire, the cryptographic communicating part 208 performs the cryptographic communication with the information processing unit 14 using the first key, without performing a process of authenticating the information processing units 14. When the term of validity of the first key expires or the first key corresponding to the identification information of the information processing units 14 is not stored, the key sharing part 202 shares the first key with the information processing units 14, and the cryptographic communicating part 208 performs the cryptographic communication with the information processing units 14 using a newly shared first key.

8 Claims, 11 Drawing Sheets

| IDENTIFICATION INFORMATION (2000) | FIRST KEY (2002) | TERM OF VALIDITY (2004) |
|---|---|---|
| xxxxx | xxxxx | yyy/mm/dd hh:mm:ss |
| xxxxx | xxxxx | yyy/mm/dd hh:mm:ss |
| ⋮ | ⋮ | ⋮ |

| IDENTIFICATION INFORMATION (2040) | COMMUNICATION CONDITION 1 (2042-1) | PRIORITY (2044-1) | COMMUNICATION CONDITION 2 (2042-2) | PRIORITY (2044-2) |
|---|---|---|---|---|
| xxxxx | xxxxx | xxx | xxxxx | xxx |
| xxxxx | xxxxx | xxx | xxxxx | xxx |
| ⋮ | ⋮ | ⋮ | ⋮ | ⋮ |

| IDENTIFICATION INFORMATION | FIRST KEY | TERM OF VALIDITY |
|---|---|---|
| xxxxx | xxxxx | yyy/mm/dd hh:mm:ss |

| COMMUNICATION CONDITION | PRIORITY |
|---|---|
| xxxxx | xxx |
| xxxxx | xxx |
| ⋮ | ⋮ |

| IDENTIFICATION INFORMATION OF COMMUNICATION COUNTERPART (1580) | SECOND KEY (1582) | COMMON COMMUNICATION CONDITION (1584) | TERM OF VALIDITY (1586) |
|---|---|---|---|
| xxxxx | xxx | xxxxx | yyy/mm/dd hh:mm:ss |
| xxxxx | xxx | xxxxx | yyy/mm/dd hh:mm:ss |
| ⋮ | ⋮ | ⋮ | ⋮ |

# COMMUNICATION SUPPORT SERVER, COMMUNICATION SUPPORT METHOD, AND COMMUNICATION SUPPORT SYSTEM

INCORPORATION BY REFERENCE

This application claims priority based on a Japanese patent application, No. 2004-379775 filed on Dec. 28, 2004, the entire contents of which are incorporated herein by reference.

BACKGROUND OF THE INVENTION

The present invention relates to a technique of performing cryptographic communication through a communication network such as the Internet.

When cryptographic communication is performed between communication terminals through a network, there is a method in which a common key for cryptographic communication is shared in advance between the communication terminals and the cryptographic communication is performed using the shared common key according to the following order. A communication terminal which initiates communication acquires a public key of a communication terminal of a communication counterpart. Then, the communication terminal which initiates the communication creates a common key to be used in the cryptographic communication with the communication terminal of the communication counterpart, encrypts the common key using the public key of the communication terminal of the communication counterpart, and transmits the encrypted common key to the communication terminal of the communication counterpart.

The communication terminal of the communication counterpart receives the common key encrypted with its public key from the communication terminal which initiates the communication, and decrypts the received encrypted common key by using private key of the communication terminal of the communication counterpart corresponding to the public key. Thus, the communication terminal which initiates the communication shares a common key to be used in the cryptographic communication with a communication terminal of communication counterparts.

In the above-described method, if the communication terminal which initiates the communication performs cryptographic communication with communication terminals of a plurality of communication counterparts, it is necessary to share the common key for cryptographic communication with the communication terminals of the plurality of communication counterparts, and accordingly, a process load of the communication terminal which initiates the communication may be increased. Therefore, Mark Baugher et al., "MSEC Group Key Management Architecture <draft-ietf-msec-gk-march-07.txt>", IETF (Internet Engineering Task Force), P3-13 (hereinafter, referred to as Non-Patent Document 1) discloses a technique in which a server, which distributes a common key for cryptographic communication to a communication terminal which initiates communication and communication terminals of communication counterparts, is provided on a network and the communication terminal which initiates the communication and the communication terminals of communication counterparts perform the cryptographic communication by using the common key distributed by the server. In the technique disclosed in Non-Patent Document 1, the server creates the common key for cryptographic communication between the communication terminal which initiates the communication and the communication terminals of communication counterparts and distributes the created common key to the communication terminal which initiates the communication and the communication terminals of communication counterparts, thereby reducing the process load of the communication terminal which initiates the communication, which is created when the communication terminal which initiates the communication creates the common key.

SUMMARY OF THE INVENTION

However, there exists a plurality of kinds of cryptographic communication methods, each of which may have a plurality of versions. On this account, in some cases, the communication terminal which initiates the communication and the communication terminals of communication counterparts may not support the cryptographic communication based on the common key distributed by the server. Thus, even if the common key is distributed by the server, the communication terminal which initiates the communication and the communication terminals of communication counterparts may not perform the cryptographic communication.

In addition, when a communication terminal initiates communication with a communication counterpart, the communication terminal needs to confirm authenticity of the communication counterpart according to a prescribed authentication process. However, when the communication terminal performs cryptographic communication with a plurality of communication counterparts, the authentication process needs be performed for all of the communication counterparts. However, it may cause increase in the process load of the communication terminal.

The present invention is provided in consideration of the above problem, and the present invention provides a technique to initiate a reliable cryptographic communication between communication terminals even if there is a plurality of kinds of cryptographic communication methods. In addition, the invention provides a technique to reduce a process load of a communication terminal involved in an authentication process.

When a communication support server of the present invention exchanges information with communication terminals, if a term of validity of a first key corresponding to identification information of the communication terminals and stored in a first key storing part is not expired, the communication support server performs the cryptographic communication with the communication terminals by using the first key being a key to be used for the cryptographic communication with the communication terminals, which is stored in the first key storing part in correspondence to identification information of the communication terminals. On the other hand, when the term of validity of the first key stored in the first key storing part in correspondence to the identification information of the communication terminals is expired or if the first key corresponding to the identification information of the communication terminals is not stored in the first key storing part, the communication support server causes a key sharing part to share the first key which is used for the cryptographic communication with the communication terminals, and performs the cryptographic communication with the communication terminals using a newly shared first key.

According to one aspect of the invention, a communication support server which supports cryptographic communication between communication terminals includes a communication condition storing part which stores communication conditions of cryptographic communication performed by the communication terminals, in correspondence to identification information of the communication terminals, with respect to each of the communication terminals, a key sharing part which shares a first key to be used for cryptographic communication with the communication terminals, a first key storing part which stores the first key, which is shared by the key sharing part with the communication terminals with a term of validity corresponding to the first key, in correspondence to the identification information of the communication terminals, a cryptographic communicating part which performs the cryptographic communication using the first key stored in the key storing part with the communication terminals having the identification information corresponding to the first key stored in the first key storing part, a common communication condition extracting part which refers to the communication condition storing part by using the identification information of two communication terminals included in a communication initiation request received from the communication terminals through the cryptographic communicating part and extracts a common communication condition which is common to the two communication terminals, and a second key information creating part which creates second key information, that is, a key used in the cryptographic communication or information for calculating the key according to the common communication condition extracted by the common communication condition extracting part and transmits the created second key information with the common communication condition to the two communication terminals through the cryptographic communicating part. When the cryptographic communication part exchanges the information with the communication terminals, if the term of validity of the first key corresponding to the identification information of the communication terminals and stored in the first key storing part does not expire, the cryptographic communicating part requests the communication terminals to perform the cryptographic communication by using the first key stored in the first key storing part in correspondence to the identification information of the communication terminals. Further, if the term of validity of the first key corresponding to the identification information of the communication terminals and stored in the first key storing part expires or the first key corresponding to the identification information of the communication terminals is not stored in the first key storing part, the cryptographic communicating part causes the key sharing part to share the first key and requests the communication terminals to perform the cryptographic communication, and provides the communications support server to perform the cryptographic communication with the communication terminals using a newly shared first key.

According to the aspect of the invention, a communication terminal can reliably initiate the communication with a communication terminal of a communication counterpart based on communication conditions supported by the communication terminal. In addition, the present invention can reduce loads of the communication terminals related to creation of cryptographic keys. Furthermore, the present invention can reduce the process load of the communication terminals related to an authentication process.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a table illustrating an exemplary structure of data stored in a cryptographic key storing part 200.

FIG. 4 is a table illustrating an exemplary structure of data stored in a communication condition storing part 204.

FIG. 6 is a table illustrating an exemplary structure of data stored in a cryptographic key storing part 142.

FIG. 7 is a table illustrating an exemplary structure of data stored in a communication condition storing part 148.

FIG. 8 is a table illustrating an exemplary structure of data stored in a cryptographic key storing part 158.

DETAILED DESCRIPTION OF THE EMBODIMENTS

Figure 1:
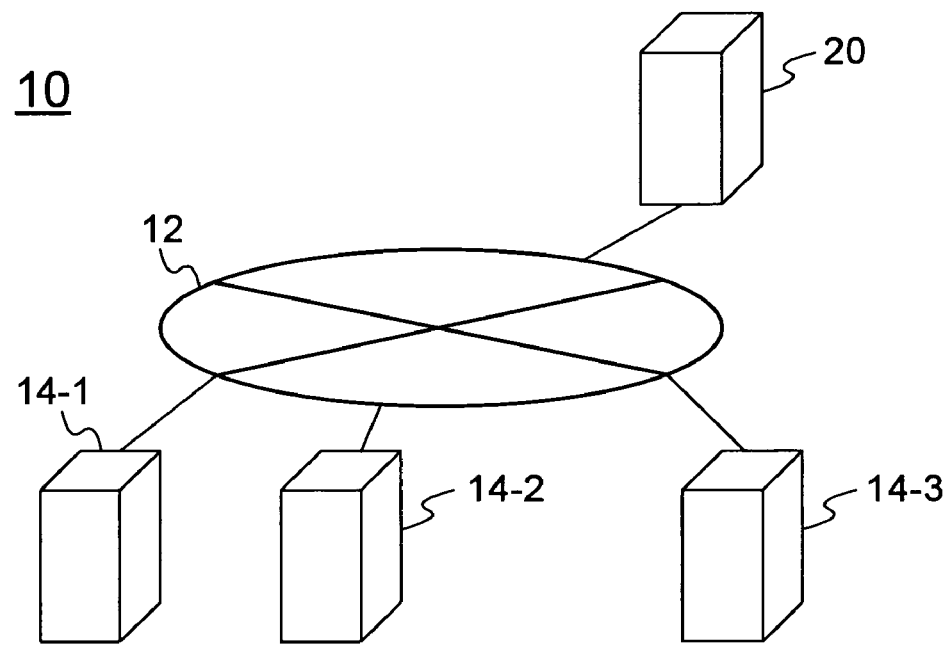
FIG. 1 is a diagram illustrating configuration of a communication support system 10 according to an embodiment of the invention.

Hereinafter, preferred embodiments of the invention will be described. FIG. 1 is a diagram illustrating configuration of a communication support system 10 according to an embodiment of the invention. The communication support system 10 includes a communication support server 20 and a plurality of information processing units 14. Each of the plurality of information processing units 14 may be, for example, a communication terminal such as a general-purpose computer, a mobile telephone or an IP (Internet Protocol) telephone, or a service providing server such as an electronic authentication server or an electronic signature validation server, etc. A plurality of information processing units 14 are connected to a communication network 12, such as the Internet, and communicate with each other through the communication network 12. In addition, the information processing unit 14 communicates with the communication support server 20, which is connected to the communication network 12, through the communication network 12 in the same way.

For example, when two information processing units 14 among the plurality of information processing units 14 communicate with each other through the communication network 12, communication data being propagated in the communication network 12 may be acquired by other information processing unit 14, that is, contents of communication between the two information processing units 14 may be leaked out to other information processing unit 14. To avoid this, the communication data between the two information processing units 14 needs to be encrypted.

In addition, the information processing units 14 may support a plurality of cryptographic methods having different methods or versions. If a cryptographic communication method supported by an information processing unit 14 of a communication source is different from that supported by an information processing unit 14 of a communication counterpart, the information processing unit 14 of the communication counterpart may not decrypt communication data encrypted by the cryptographic method supported by the information processing unit 14 of the communication source. This may cause a failure of a proper cryptographic communication. In the embodiment, the information processing units 14 register communication conditions supported by the respective information processing units 14, in advance, in the communication support server 20, and, when the information processing unit 14 of a communication source initiates communication with the information processing unit 14 of the communication counterpart, the information processing unit 14 causes the communication support server 20 to create a cryptographic key, such as a common key, to be used for cryptography based on a communication condition common to the information processing unit 14 of the communication source and an information processing unit 14 of a communication counterpart. Thus, the information processing unit 14 of the communication source and the information processing unit 14 of the communication counterpart can initiate the cryptographic communication properly. Hereinafter, details of the cryptographic communication according to the embodiment of the invention will be described.

Figure 2:
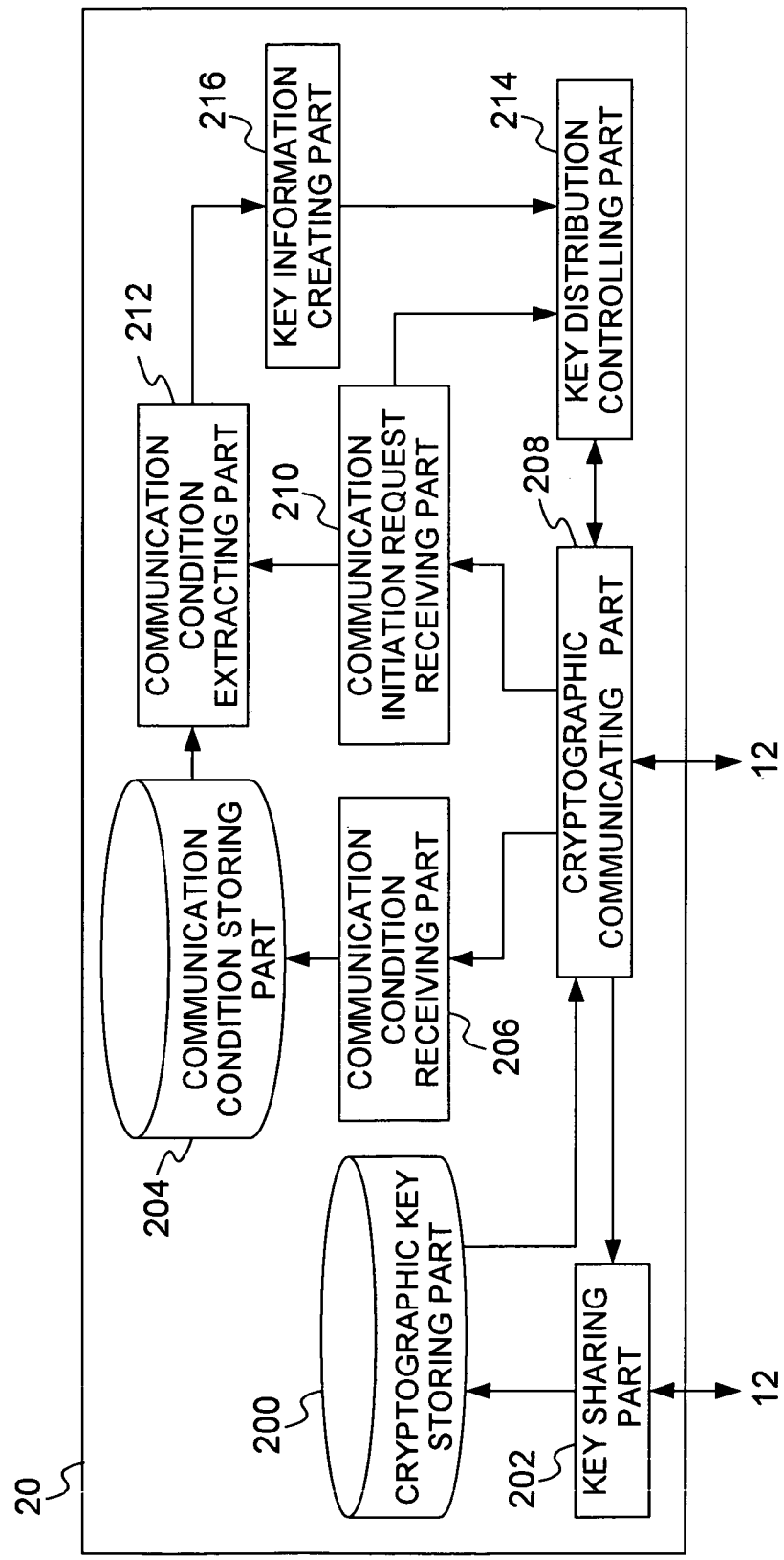
FIG. 2 is a block diagram illustrating an exemplary configuration of a communication support server 20.

FIG. 2 is a block diagram illustrating an exemplary configuration of the communication support server 20. The communication support server 20 includes a cryptographic key storing part 200, a key sharing part 202, a communication condition storing part 204, a communication condition receiving part 206, a cryptographic communicating part 208, a communication initiation request receiving part 210, a communication condition extracting part 212, a key distribution controlling part 214, and a key information creating part 216. The key sharing part 202 shares a first key, which is cryptographic keys based on a cryptographic communication method determined according to a predetermined procedure such as authentication, with the information processing units 14, respectively. Here, the first key means a key used in common by two units performing the cryptograph communication. That is to say, in the embodiment, the first key means a key used for an encrypted communication between the communication support server 20 and the information processing units 14.

The cryptographic key storing part 200 stores the respective first keys shared with the information processing units 14 by the key sharing part 202, along with a term of validity of the first key, in correspondence to identification information of the information processing units 14.

When an information processing unit 14 accesses the cryptographic communicating part 208 by using identification information of the information processing unit 14, the cryptographic communicating part 208 refers to the cryptographic key storing part 200 based on the identification information and determines whether or not a first key within the term of validity is stored in the cryptographic key storing part 200 in correspondence to the identification information. If the first key within the term of validity is stored in the cryptographic key storing part 200 in correspondence to the identification information, the cryptographic communicating part 208 reads the first key corresponding to the identification information from the cryptographic key storing part 200, decrypts data received from the information processing units 14 by using the first key, and transmits the decrypted data to the communication condition receiving part 206, the communication initiation request receiving part 210, and the key distribution controlling part 214. If the first key within the term of validity is not stored in the cryptographic key storing part 200 in correspondence to the identification information, the cryptographic communicating part 208 causes the key sharing part 202 to share the first key with the information processing unit 14.

In addition, when the cryptographic communicating part 208 accesses an information processing unit 14, before accessing the information processing unit 14, the cryptographic communicating part 208 refers to the cryptographic key storing part 200 based on identification information of the information processing unit 14 to be accessed and determines whether or not a first key within the term of validity is stored in the cryptographic key storing part 200 in correspondence to the identification information. If the first key within the term of validity is stored in the cryptographic key storing part 200 in correspondence to the identification information, the cryptographic communicating part 208 reads the first key corresponding to the identification information from the cryptographic key storing part 200, encrypts data to be transmitted to the information processing unit 14 by using the first key, and transmits the encrypted data to the information processing unit 14 through the communication network 12. If the first key within the term of validity is not stored in the cryptographic key storing part 200 in correspondence to the identification information, the cryptographic communicating part 208 causes the key sharing part 202 to execute a process of sharing the first key with the information processing unit 14.

In this manner, when the first key within the term of validity is stored in the cryptographic key storing part 200, the communication support server 20 omits the first key sharing process to be performed by the key sharing part 202. Thus, the communication support server 20 may quickly initiate the communication with the information processing unit 14, as compared to a configuration in which the first key sharing process is performed each time the communication with the information processing unit 14 is performed.

The communication condition storing part 204 stores a communication condition of cryptographic communication supported by the information processing unit 14 for each information processing unit 14 in correspondence to the identification information of the information processing unit 14. The communication condition means information such as the kind and version of an encryption algorithm to be supported and a key length, for example. The communication condition receiving part 206 receives communication conditions on the respective information processing units 14, along with the identification information of the information processing units 14, from the information processing units 14 through the cryptographic communicating part 208. In addition, the communication condition receiving part 206 stores the received communication conditions in the communication condition storing part 204 in correspondence to the identification information of the information processing units 14.

When receiving a communication initiation request including the identification information of two communicating information processing units 14 from the information processing units 14 through the cryptographic communicating part 208, the communication initiation request receiving part 210 transmits the received communication initiation request to the key distribution controlling part 214. In addition, the communication initiation request receiving part 210 extracts the identification information of the two communicating information processing units 14 from the received communication initiation request and transmits the extracted identification information of the two communicating information processing units 14 to the communication condition extracting part 212. The communication condition extracting part 212 refers to the communication condition storing part 204 based on the identification information of the two communicating information processing units 14 received from the communication initiation request receiving part 210 and extracts a common communication condition which is common in the two communicating information processing units 14.

The key information creating part 216 creates a second key, which is a key to be used for cryptographic communication according to the common communication condition extracted by the communication condition extracting part 212, and sets a term of validity of the second key. In addition, the key information creating part 216 transmits the created second key and the term of validity of the second key, along with the common communication condition extracted by the communication condition extracting part 212, to the key distribution controlling part 214. As another embodiment, the key information creating part 216 may create second key information, which is kind information in order to produce a key to be used in the cryptographic communication according to the common communication condition extracted by the communication condition extracting part 212, set the term of validity of the second key information, and transmit the created second key information and the term of validity, along with the common communication condition extracted by the communication condition extracting part 212, to the key distribution controlling part 214. Here, the second key means a key used in common by two units performing cryptograph communication. In the embodiment, the second key means a key used for the cryptograph communication between two information processing units 14 performing the encrypted communication.

The key distribution controlling part 214 extracts the identification information of the two communicating information processing units 14 from the communication initiation request received from the communication initiation request receiving part 210. In addition, the key distribution controlling part 214 transmits the second key and the term of validity created by the key information creating part 216, along with the communication initiation request, to an information processing unit 14 corresponding to identification information of a communication counterpart of the extracted identification information of the information processing units 14 through the cryptographic communicating part 208. In addition, when receiving communication initiation permission, which is returned by the information processing unit 14 in response to the transmitted communication initiation request, through the cryptographic communicating part 208, the key distribution controlling part 214 refers to the identification information of the information processing unit 14 included in the received communication initiation permission and transmits the second key and the term of validity created by the key information creating part 216, along with the communication initiation permission, to the information processing unit 14, which transmitted the communication initiation request, through the cryptographic communicating part 208.

In this manner, the communication support server 20 creates the second key based on the common communication condition and transmits the created second key to the corresponding information processing unit 14 through the communication network 12. Accordingly, compared to the configuration that cryptographic keys are created and the created cryptographic keys are simply distributed to the respective information processing units 14, the information processing unit 14 can reliably initiate the cryptographic communication with other information processing units 14 by using the cryptographic key distributed by the communication support server 20 because cryptographic keys based on communication conditions which are not supported by the information processing units 14 are not distributed.

FIG. 3 is a table illustrating an exemplary structure of data stored in the cryptographic key storing part 200. The cryptographic key storing part 200 stores a first key 2002, which is a cryptographic key to be used for cryptographic communication between the information processing unit 14 and the other information processing unit 14, and the term of validity 2004, which is the term for which the first key 2002 can be continuously used, in correspondence to identification information 2000.

By referring to the cryptographic key storing part 200, when the information processing unit 14 accesses the cryptographic communicating part 208 and the first key within the term of validity corresponding to the identification information of the information processing unit 14 exists, the cryptographic communicating part 208 can read the first key corresponding to the identification information from the cryptographic key storing part 200 and perform the cryptographic communication with the information processing unit 14, which accesses the cryptographic communicating part 208 by using the read first key. On the other hand, if the first key within the term of validity corresponding to the accessing information processing unit 14 does not exist in the cryptographic key storing part 200, the cryptographic communicating part 208 can cause the key sharing part 202 to share the first key with the accessing information processing unit 14.

As another embodiment, the communication support server 20 may have a unit which deletes a first key which elapses the term of validity from the cryptographic key storing part 200 by using a time measuring function of the communication support server 20. In this case, it is preferable that the cryptographic communicating part 208 determines whether the first key corresponding to the information processing unit 14 which accesses the cryptographic communicating part 208 or which is accessed by it is stored in the cryptographic key storing part 200. Accordingly, the term of validity of the first key does not need to be verified so that the cryptographic communication with the information processing unit 14 can be initiated at a higher speed.

FIG. 4 is a table illustrating an exemplary structure of data stored in the communication condition storing part 204. The communication condition storing part 204 stores a plurality of communication conditions 2042 and priorities 2044 corresponding to the plurality of communication conditions 2042 in correspondence to identification information 2040. By referring to the communication condition storing part 204, the communication condition extracting part 212 can extract a communication condition common to two information processing units 14.

In addition, if there exists a plurality of common communication conditions in the communication conditions of the two information processing units 14, the communication condition extracting part 212 extracts a common communication condition from the plurality of common communication conditions. In this case, the common communication condition has, for example, the highest priority, and the common communication condition is a communication condition of an information processing unit 14 which transmits a communication initiation request.

Thus, the information processing unit 14 can realize the cryptographic communication between terminals in compliance with a preference of the information processing unit 14 that transmits the communication initiation request, when the information processing unit 14 needs to increase the strength of encryption to reduction of process time or when the information processing unit 14 needs to reduce the process time at some sacrifice of the strength of encryption.

In addition, if the common communication conditions do not exist in the communication condition storing part 204, the communication condition extracting part 212 extracts NULL data as the common communication condition, for example. When the communication condition extracting part 212 extracts the NULL data, the key information creating part 216 transmits the NULL data extracted by the communication condition extracting part 212 to the key distribution controlling part 214. When the key distribution controlling part 214 receives the NULL data from the key information creating part 216, the key distribution controlling part 214 informs that the common communication conditions do not exist to the information processing unit 14, which transmitted the communication initiation request, through the cryptographic communicating part 208.

Figure 5:
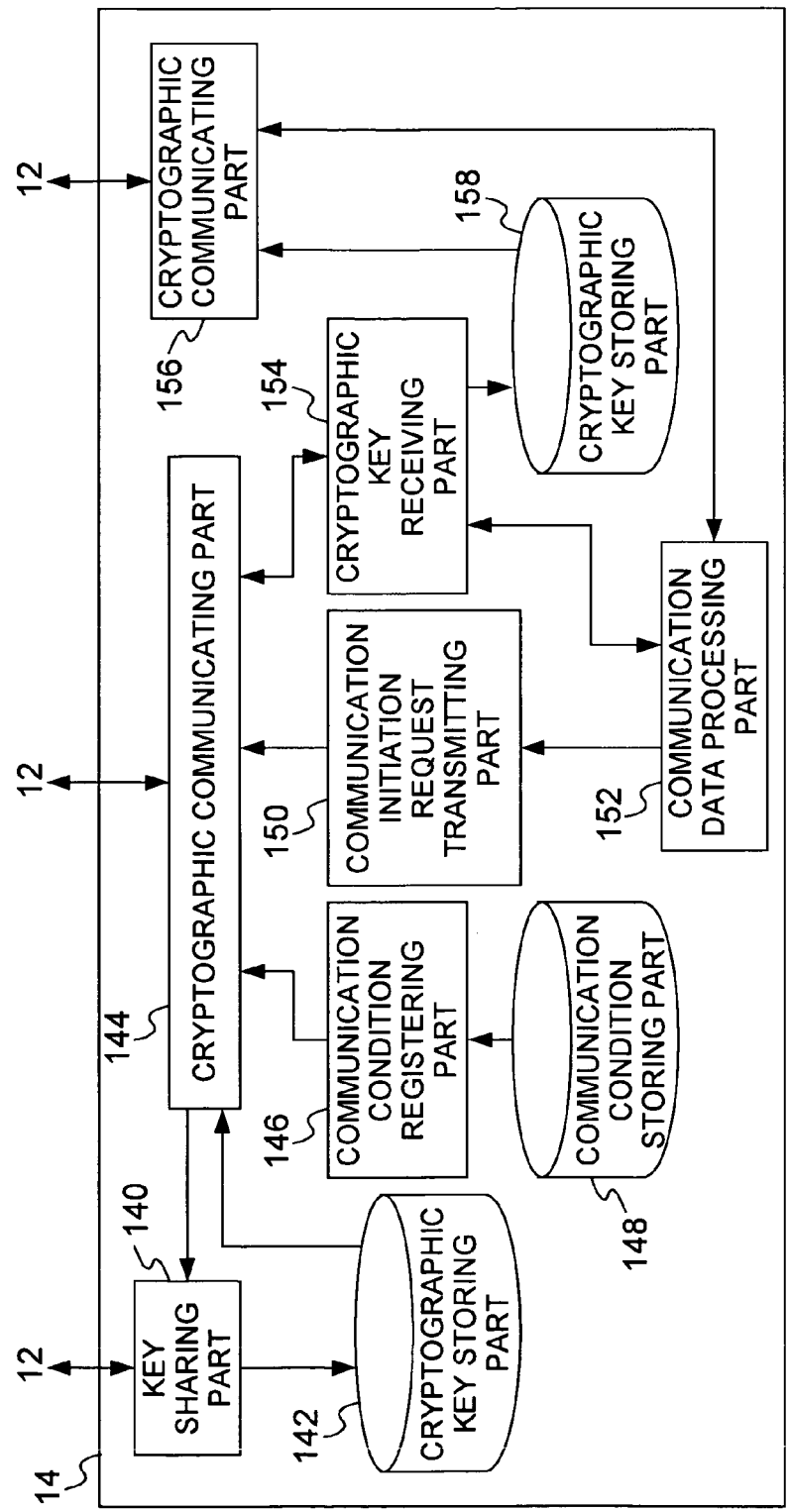
FIG. 5 is a block diagram illustrating an exemplary configuration of an information processing unit 14.

FIG. 5 is a block diagram illustrating an exemplary configuration of the information processing unit 14. The information processing unit 14 includes a key sharing part 140, a cryptographic key storing part 142, a cryptographic communicating part 144, a communication condition registering part 146, a communication condition storing part 148, a communication initiation request transmitting part 150, a communication data processing part 152, a cryptographic key receiving part 154, a cryptographic communicating part 156, and a cryptographic key storing part 158.

The key sharing part 140 shares the first key with the communication support server 20 according to a predetermined procedure such as authentication. The cryptographic key storing part 142 stores the first key shared with the communication support server 20 by the key sharing part 140 in correspondence to the term of validity of the first key.

When the communication support server 20 accesses the cryptographic communicating part 144, the cryptographic communicating part 144 refers to the cryptographic key storing part 142 and determines whether or not the first key within the term of validity is stored in the cryptographic key storing part 142. If the first key within the term of validity is stored in the cryptographic key storing part 142, the cryptographic communicating part 144 reads the first key from the cryptographic key storing part 142, decrypts communication data received from the communication support server 20 using the first key, and transmits the decrypted communication data to the cryptographic key receiving part 154. If the first key within the term of validity is not stored in the cryptographic key storing part 142, the cryptographic communicating part 144 causes the key sharing part 140 to share the first key with the communication support server 20. Thereafter, the cryptographic communicating part 144 reads the first key from the cryptographic key storing part 142, decrypts the communication data received from the communication support server 20 by using the first key, and transmits the decrypted communication data to the key receiving part 154.

In addition, when the cryptographic communicating part 144 accesses the communication support server 20, before accessing the communication support server 20, the cryptographic communicating part 144 refers to the cryptographic key storing part 142 and determines whether or not the first key within the term of validity is stored in the cryptographic key storing part 142. If the first key within the term of validity is stored in the cryptographic key storing part 142, the cryptographic communicating part 144 reads the first key from the cryptographic key storing part 142, encrypts communication data received from the communication condition registering part 146, the communication initiation request transmitting part 150, and the cryptographic key receiving part 154 by using the first key, and transmits the encrypted communication data to the communication support server 20 through the communication network 12. If the first key within the term of validity is stored in the cryptographic key storing part 142, the cryptographic communicating part 144 causes the key sharing part 140 to share the first key with the communication support server 20. Thereafter, the cryptograph communication part 144 encrypts, by using the first key, the communication data received from the communication data registering part 146, the communication data processing part 150, and the cryptographic key receiving part 154, and transmits the encrypted data to the communication support server 20 through the communication network 12.

The communication condition storing part 148 stores a communication condition supported by the information processing unit 14. The communication condition registering part 146 refers to the communication condition storing part 148, and, when the communication condition is changed, reads the communication condition supported by the information processing unit 14 from the communication condition storing part 148 and transmits the read communication condition to the communication support server 20 through the cryptographic communicating part 144. In addition, in this embodiment, even when some of the supported communication condition is changed or added, the communication condition registering part 146 transmits all communication conditions stored in the communication condition storing part 148 to the communication support server 20.

The communication data processing part 152 creates identification information of an information processing unit 14 of a communication counterpart and communication data to be transmitted, and processes the communication data received through the cryptographic communicating part 156. The communication initiation request transmitting part 150 transmits the communication initiation request along with the identification information of the information processing unit 14 of the communication counterpart and the identification information of its own information processing unit 14, to the communication support server 20 through the cryptographic communicating part 144.

The cryptographic key receiving part 154 receives communication initiation permission transmitted from the communication support server 20 in response to the communication initiation request transmitted by the communication initiation request transmitting part 150, along with a second key created based on a communication condition common to its own information processing unit 14 and the information processing unit 14 of the communication counterpart, a common communication condition, and the term of validity of the second key. In addition, the cryptographic key receiving part 154 extracts the identification information of the information processing unit 14 of the communication counterpart from the received communication initiation permission and transmits the extracted identification information, along with the second key, the common communication condition and the term of validity, which are received from the communication support server 20, to the cryptographic key storing part 158. The cryptographic key storing part 158 stores the second key, the common communication condition and the term of validity, which are received by the cryptographic key receiving part 154 from the communication support server 20, in correspondence to the identification information of the information processing unit 14 of the communication counterpart, which is extracted from the communication initiation permission by the cryptographic key receiving part 154.

In addition, when receiving a communication initiation request from a different information processing unit 14 through the communication support server 20, the cryptographic key receiving part 154 informs the communication data processing part 152 of the communication initiation request. When receiving the communication initiation request from the cryptographic key receiving part 154, the communication data processing part 152 determines whether or not it performs cryptographic communication with the information processing unit 14 that transmits the communication initiation request. If the communication data processing part 152 performs the cryptographic communication with the information processing unit 14 that transmits the communication initiation request, it transmits communication initiation permission for the information processing unit 14, which transmits the communication initiation request, to the cryptographic key receiving part 154 through the cryptographic communicating part 144. On the other hand, if the communication data processing part 152 does not perform the cryptographic communication with the information processing unit 14 that transmits the communication initiation request, it informs the cryptographic key receiving part 154, through the cryptographic communicating part 144, that communication initiation for the information processing unit 14 that transmits the communication initiation request is not permitted. In addition, when the cryptographic key receiving part 154 is informed that communication initiation transmitted by a different information processing unit 14 in response to the communication initiation request is not permitted, it informs the communication data processing part 152 of the fact.

When the communication data processing part 152 creates the communication data which is to be transmitted by receiving a communication request from application software, the cryptographic communicating part 156 receives the communication data and the identification information of the information processing unit 14 of the communication counterpart from the communication data processing part 152. In addition, the cryptographic communicating part 156 refers to the cryptographic key storing part 158 based on the identification information of the information processing unit 14 of the communication counterpart, which is received from the communication data processing part 152, and determines whether or not the second key within the term of validity is stored in the cryptographic key storing part 158 in correspondence to the identification information. If the second key within the term of validity is stored in the cryptographic key storing part 158 in correspondence to the identification information, the cryptographic communicating part 156 reads the second key corresponding to the identification information and the common communication condition from the cryptographic key storing part 158. In addition, the cryptographic communicating part 156 encrypts the communication data received from the communication data processing part 152 by using the read second key, according to an encryption algorithm or information such as a version, which is contained in the read common communication condition, and transmits the encrypted communication data to the information processing unit 14 of the communication counterpart through the communication network 12. On the other hand, if the second key within the term of validity is not stored in the cryptographic key storing part 158 in correspondence to the identification information, the cryptographic communicating part 156 informs the communication data processing part 152 that there is a need for the communication data processing part 152 to receive the second key from the communication support server 20. When receiving the fact, the communication data processing part 152 executes the communication initiation request transmitting part 150 to transmit the communication initiation request to the communication support server 20.

In addition, when receiving the communication data from the information processing unit 14 through the communication network 12, the cryptographic communicating part 156 refers to the cryptographic key storing part 158 based on the identification information of the information processing unit 14 of the communication counterpart, which is included in the received communication data, and determines whether or not the second key within the term of validity is stored in the cryptographic key storing part 158 in correspondence to the identification information. If the second key within the term of validity is stored in the cryptographic key storing part 158 in correspondence to the identification information, the cryptographic communicating part 156 reads the second key corresponding to the identification information and the common communication condition from the cryptographic key storing part 158, and, based on the read common communication condition and the corresponding second key, decrypts the communication data received from the communication data processing part 152 and transmits the decrypted communication data to the communication data processing part 152.

On the other hand, if the second key within the term of validity is not stored in the cryptographic key storing part 158 in correspondence to the identification information, the cryptographic communicating part 156 informs the information processing unit 14, which transmits the communication data, that there is a need for receiving the second key from the communication support server 20. When the information processing unit 14 transmitting the communication data receives the need for receiving the second key, by using the communication data processing part 152, the information processing unit 14 causes the communication initiation request transmitting part 150 to transmit the communication initiation request to the communication support server 20.

As another embodiment, it is preferable that the information processing unit 14 has a unit which deletes a first key, which a term of the validity elapses, from the cryptographic key storing part 142 by using a time measuring function of the information processing unit 14. In this case, when the cryptographic communicating part 144 is accessed by the communication support server 20 or accesses the communication support server 20, it is preferable that the cryptographic communicating part 144 determines whether or not the first key is stored in the cryptographic key storing part 142, without verifying the term of validity of the first key. The cryptographic communicating part 144 allows the cryptographic communication with the communication support server 20 to be initiated at a higher speed.

FIG. 6 is a table illustrating an exemplary structure of data stored in the cryptographic key storing part 142. The cryptographic key storing part 142 stores a first key 1422, which is used for cryptographic communication between the communication support server 20, and the term of validity 1424, which is the term for which the first key 1422 can continue to be used, in correspondence to identification information 1420 of the communication support server 20. By referring to the cryptographic key storing part 142, the cryptographic communicating part 144 can perform the cryptographic communication with the communication support server 20 using the first key. In addition, when the cryptographic communicating part 144 accesses the communication support server 20 or is accessed by the communication support server 20, by referring to the cryptographic key storing part 142, if there exists the first key within the term of validity in the cryptographic key storing part 142, the cryptographic communicating part 144 can perform the cryptographic communication with the communication support server 20 by using the first key. On the other hand, if there exists no first key within the term of validity, the cryptographic communicating part 144 can execute the key sharing unit 140 to perform a process of sharing the first key with the communication support server 20.

FIG. 7 is a table illustrating an exemplary structure of data stored in the communication condition storing part 148. The communication condition storing part 148 stores priorities 1482 in correspondence to communication conditions 1480 supported by its own information processing unit 14. By referring to the communication condition storing part 148, the communication condition registering part 146 can register the communication conditions having corresponding priorities in the communication condition storing part 204 of the communication support server 20. In addition, with registering processing described above, the communication condition extracting part 212 refers to the communication condition storing part 204 to extract a common communication condition based on the priorities. Thus, the communication support system 10 can realize the cryptographic communication between terminals in compliance with a preference of the information processing unit 14 that transmits the communication initiation request.

FIG. 8 is a table illustrating an exemplary structure of data stored in the cryptographic key storing part 158. The cryptographic key storing part 158 stores a second key 1582 to be used for cryptographic communication between the information processing unit 14 of the communication counterpart, a common communication condition 1584 common to its own information processing unit 14 and the information processing unit 14 of the communication counterpart, and the term of validity 1586, which is the term for which the first key 1582 and the common communication condition 1584 can continue to be used, in correspondence to communication counterpart identification information 1580, which is information for identifying the information processing unit 14 of the communication counterpart. By referring to the cryptographic key storing part 158, the cryptographic communicating part 156 can determine whether or not the second key within the term of validity, which is used for encrypting the data transmitted and decrypting the data received between the information processing unit 14 as the communication counterpart, is stored in the cryptographic key storing part 158.

Figure 9:
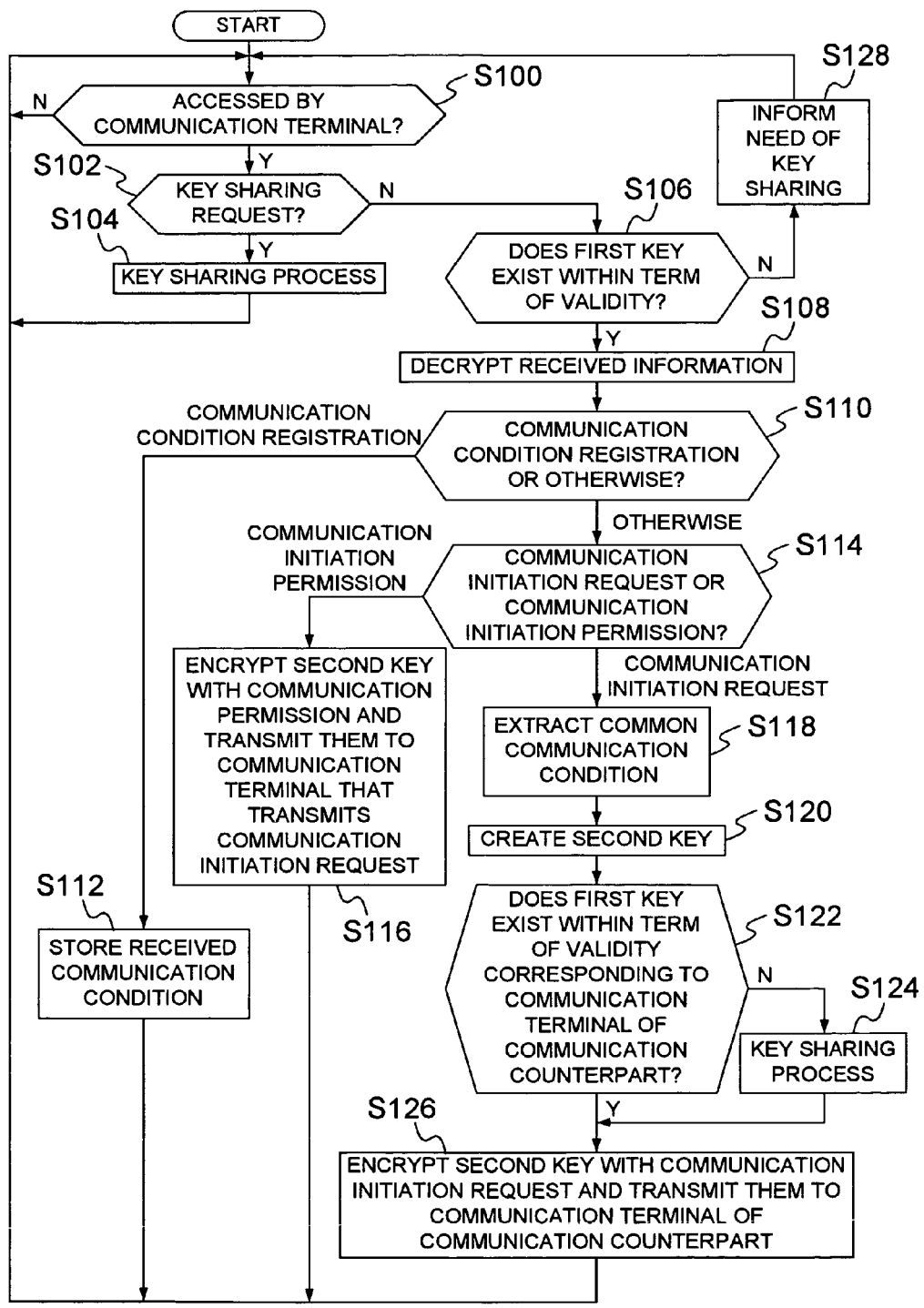
FIG. 9 is a flowchart illustrating an embodiment of operation of the communication support server 20.

FIG. 9 is a flowchart illustrating an embodiment of operation of the communication support server 20. The communication support server 20 starts a process shown in the flowchart at a predetermined timing such as an input of power. First, the cryptographic communicating part 208 determines whether or not it is accessed by the information processing unit 14 (Step S100). If the cryptographic communicating part 208 is not accessed by the information processing unit 14 (NO in Step S100), it repeats Step S100 until it is accessed by the information processing unit 14.

In Step S100, if the cryptographic communicating part 208 is accessed by the information processing unit 14 (YES in Step S100), the cryptographic communicating part 208 determines whether or not there is communication data to request share of the first key (Step S102). If it is determined that there is communication data to request share of the first key (YES in Step S102), the cryptographic communicating part 208 causes the key sharing part 202 to perform a process of sharing the first key with the accessing information processing unit 14 (Step S104) and then repeats the process shown in Step S100.

In Step S104, the key sharing part 202 receives one or more parameter candidates to be used for cryptographic communication between the communication support server 20 and the information processing unit 14, for example, from the key sharing part 140 of the information processing unit 14. In addition, the key sharing part 202 selects one parameter, which is supported by the cryptographic communicating part 208, from the received parameter candidates and shares the selected parameter for cryptographic communication with the key sharing part 140 by transmitting the selected parameter to the key sharing part 140. In addition, the key sharing part 202 transmits a public key certificate of the communication support server 20 to the key sharing part 140 and requests the key sharing part 140 to provide a public key certificate of the information processing unit 14. In addition, the key sharing part 202 verifies the public key certificate received from the key sharing part 140 by checking the term of validity and electronic signature of the public key certificate.

When the verification of the public key certificate is successfully executed, the key sharing part 202 and the key sharing part 140 transmit the shared parameter with the electronic signature of the parameter to a communication counterpart and authenticate the communication counterpart by verifying an electronic signature received from the communication counterpart. In addition, when mutual authentication between the key sharing part 202 and the key sharing part 140 is successfully executed, the key sharing part 140 creates the first key to be used for cryptographic communication with the cryptographic communicating part 208 of the communication support server 20 based on the shared parameter. In addition, the key sharing part 140 encrypts the created first key using the public key of the communication support server 20 and shares the first key to be used for cryptographic communication with the key sharing part 202 by transmitting the encrypted first key to the key sharing part 202.

In addition, the key sharing part 202 may request an external verification server to verify the public key certificate received from the key sharing part 140. When verification of the public key certificate is requested from the key sharing part 202, the verification server, on one hand, verifies the term of validity and the signature of the public key certificate, while on the other hand, the verification server finds an Certificate Authority described in the public key certificate, obtains revocation information of the public key certificate from the found Certificate Authority, and verifies the public key certificate by checking the obtained revocation information. Thus, the key sharing part 202 can verify the public key certificate of the information processing unit 14 more strictly.

In Step S102, if it is determined that received communication data is not communication data to request share of the first key (NO in Step S102), the cryptographic communicating part 208 refers to the cryptographic key storing part 200 based on the identification information of the accessing information processing unit 14 and determines whether or not the first key within the term of validity is stored in the cryptographic key storing part 200 in correspondence to the identification information (Step S106). If the first key within the term of validity is not stored in the cryptographic key storing part 200 in correspondence to the identification information (NO in Step S106), the cryptographic communicating part 208 executes the key sharing part 202 to inform the accessing information processing unit 14 that there is a need to perform the process of sharing the first key (Step S128) and then repeats the process shown in Step S100.

In Step S106, if the first key within the term of validity is stored in the cryptographic key storing part 200 in correspondence to the identification information (YES in Step S106), the cryptographic communicating part 208 reads the corresponding first key from the cryptographic key storing part 200 and decrypts the received communication data by using the read first key.

In addition, the cryptographic communicating part 208 transmits the decrypted communication data to the communication condition receiving part 206, the communication initiation request receiving part 210, and the key distribution controlling part 214 (Step S108). Next, the communication condition receiving part 206 determines whether or not the received communication data is data to request registration of the communication condition (Step S110). If the received communication data is data to request registration of the communication condition (communication condition registration in Step S110), the communication condition receiving part 206 stores the communication condition, which is included in the received communication data, in the communication condition storing part 204 in correspondence to the identification information of the information processing unit 14 that transmits the communication data (Step S112), and the cryptographic communicating part 208 repeats the process shown in Step S100.

If the received communication data is not data to request registration of the communication condition (otherwise in Step S110), the communication initiation request receiving part 210 and the key distribution controlling part 214 determines whether the received communication data is data representing the communication initiation request or data representing the communication initiation permission transmitted in response to the communication initiation request (Step S114). If the received communication data is data representing the communication initiation permission (communication initiation permission in Step S114), the key distribution controlling part 214 transmits the second key created by the key information creating part 216, the common communication condition, and the term of validity of the second key with the communication initiation permission to the information processing unit 14 which transmitted the communication initiation request (Step S116), through the cryptographic communicating part 208, and the cryptographic communicating part 208 repeats the process shown in Step S100.

In Step S114, if the received communication data is data representing the communication initiation request (communication initiation request in Step S114), the communication initiation request receiving part 210 extracts the identification information of two communicating information processing units 14 from the received communication initiation request and transmits the extracted identification information of the information processing units 14 to the communication condition extracting part 212. Then, the communication condition extracting part 212 refers to the communication condition storing part 204 based on the identification information of the two information processing units 14, which is received from the communication initiation request receiving part 210, and extracts a common communication condition, which is a communication condition common to the two information processing units 14 (Step S118).

Next, the key information creating part 216 creates the second key to be used for cryptographic communication according to the common communication condition extracted by the communication condition extracting part 212, and sets the term of validity of the second key. In addition, the key information creating part 216 transmits the created second key and the term of validity, along with the common communication condition extracted by the communication condition extracting part 212, to the key distribution controlling part 214. The key distribution controlling part 214 extracts the identification information of the two communicating information processing units 14 from the communication initiation request received from the communication initiation request receiving part 210. In addition, the key distribution controlling part 214 transmits the second key created by the key information creating part 216 and the term of validity, and the common communication condition extracted by the communication condition extracting part 212, along with the communication initiation request, to the cryptographic communicating part 208, taking the identification information of the information processing unit 14 of the communication counterpart of the extracted identification information of the information processing units 14 as a receiving site (Step S120).

Next, the cryptographic communicating part 208 refers to the cryptographic key storing part 200 based on the identification information of the information processing unit 14, which is received as the receiving site from the key distribution controlling part 214, and determines whether or not the first key within the term of validity is stored in the cryptographic key storing part 200 in correspondence to the identification information (Step S122). If the first key within the term of validity is stored in the cryptographic key storing part 200 in correspondence to the identification information (YES in Step S122), the cryptographic communicating part 208 reads the corresponding first key from the cryptographic key storing part 200. In addition, the cryptographic communicating part 208 encrypts the second key and the term of validity, which are received from the key distribution controlling part 214, and the common communication condition extracted by the communication condition extracting part 212, along with the communication initiation request, by using the read first key, and transmits them to the information processing unit 14 of the communication counterpart (Step S126), and the cryptographic communicating part 208 repeats the process shown in Step S100.

In Step S122, if the first key within the term of validity is not stored in the cryptographic key storing part 200 in correspondence to the identification information (NO in Step S122), the cryptographic communicating part 208 executes the key sharing part 202 to perform the process of sharing the first key with the information processing unit 14 of the communication counterpart (Step S124) and performs the process shown in Step S126.

Figure 10:
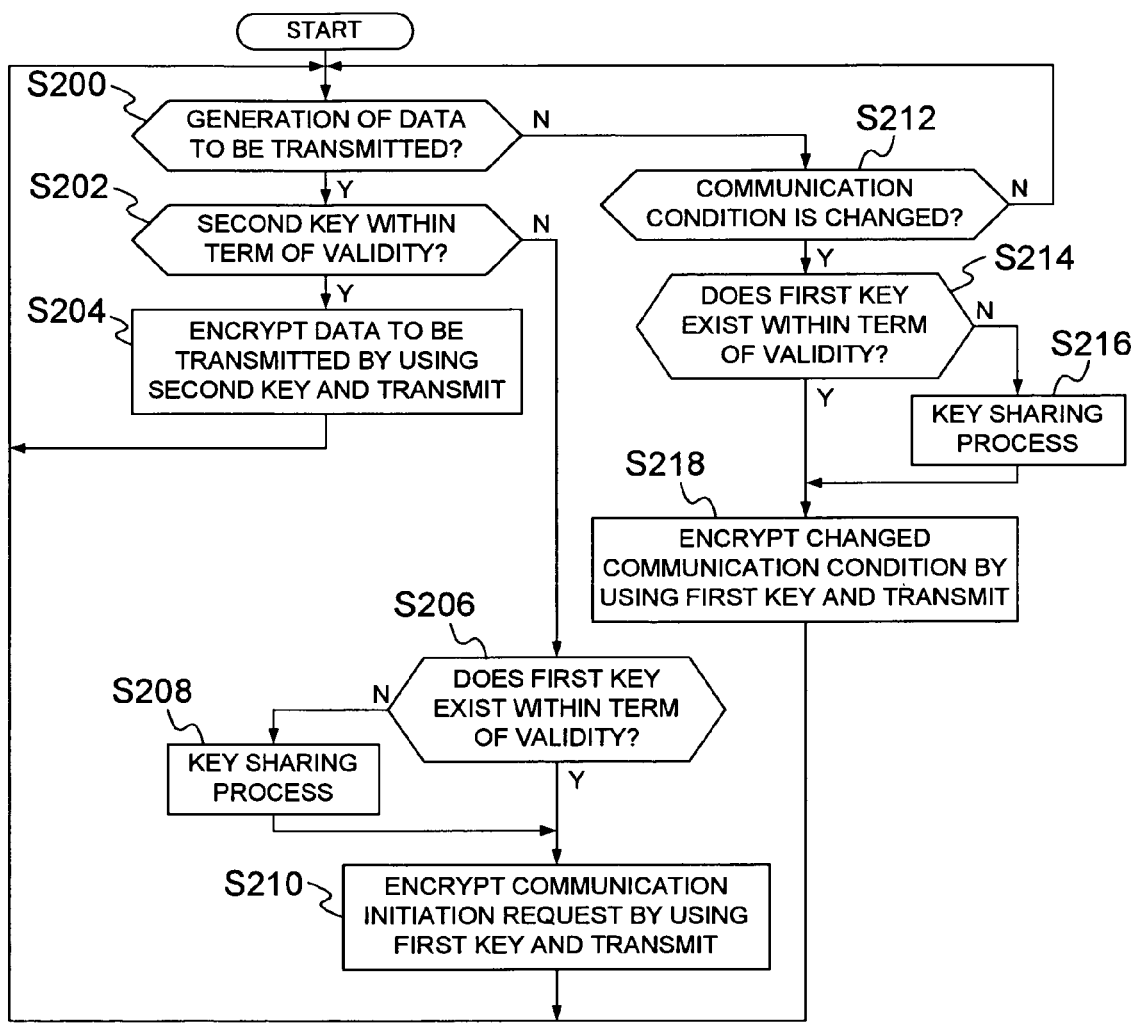
FIG. 10 is a flowchart illustrating an embodiment of operation of the information processing unit 14 when the information processing unit 14 accesses the communication support server 20 or other information processing units 14.

FIG. 10 is a flowchart illustrating an embodiment of operation of the information processing unit 14 when the information processing unit 14 accesses the communication support server 20 or other information processing units 14. The information processing unit 14 starts a process shown in the flowchart at a predetermined timing such as an input of power. First, the communication data processing part 152 determines whether or not communication data to be transmitted is created (Step S200). If the communication data to be transmitted is created (YES in Step S200), the cryptographic communicating part 156 receives the communication data and the identification information of the information processing unit 14 of the communication counterpart from the communication data processing part 152. In addition, the cryptographic communicating part 156 refers to the cryptographic key storing part 158 based on the received identification information of the information processing unit 14 of the communication counterpart, and determines whether or not the second key within the term of validity is stored in the cryptographic key storing part 158 in correspondence to the identification information (Step S202). If the second key within the term of validity is stored in the cryptographic key storing part 158 in correspondence to the identification information (YES in Step S202), the cryptographic communicating part 156 reads the corresponding second key from the cryptographic key storing part 158. In addition, the cryptographic communicating part 156 encrypts the communication data received from the communication data processing part 152 by using the read second key, and transmits the encrypted communication data to the information processing unit 14 of the communication counterpart through the communication network 12 (Step S204). Then, the communication data processing part 152 repeats the process shown in Step S200.

In Step S202, if the second key within the term of validity is not stored in the cryptographic key storing part 158 in correspondence to the identification information (NO in Step S202), the cryptographic communicating part 156 informs the communication data processing part 152 that there is a need for the communication data processing part 152 to receive the second key from the communication support server 20. When receiving the fact, the communication data processing part 152 executes the communication initiation request transmitting part 150 to transmit the communication initiation request to the communication support server 20 through the cryptographic communicating part 144. In this case, the cryptographic communicating part 144 determines whether or not the first key within the term of validity is stored in the cryptographic key storing part 142 (Step S206). If the first key within the term of validity is stored in the cryptographic key storing part 142 (YES in Step S206), the cryptographic communicating part 144 reads the first key from the cryptographic key storing part 142. In addition, the cryptographic communicating part 144 encrypts the communication initiation request received from the communication initiation request transmitting part 150 by using the read first key and transmits the encrypted communication initiation request to the communication support server 20 through the communication network 12 (Step S210). Then, the communication data processing part 152 repeats the process shown in Step S200.

In Step S206, if the first key within the term of validity is not stored in the cryptographic key storing part 142 (NO in Step S206), the cryptographic communicating part 144 executes the key sharing part 140 to perform the process of sharing the first key with the communication support server 20 (Step S208) and performs the process shown in Step S210.

In Step S200, if the communication data to be transmitted is not created (NO in Step S200), the communication condition registering part 146 refers to the communication condition storing part 148 and determines whether or not the communication condition stored in the communication condition storing part 148 is changed (Step S212). If the communication condition is not changed (NO in Step S212), the communication data processing part 152 repeats the process shown in Step S200.

In Step S212, if the communication condition is changed (YES in Step S212), the communication condition registering part 146 reads all of communication conditions stored in the communication condition storing part 148. In addition, the communication condition registering part 146 creates a communication condition registration request including the read communication conditions and transmits the created communication condition registration request to the cryptographic communicating part 144. Next, cryptographic communicating part 144 determines whether or not the first key within the term of validity is stored in the cryptographic key storing part 142 (Step S214). If the first key within the term of validity is stored in the cryptographic key storing part 142 (YES in Step S214), the cryptographic communicating part 144 reads the first key from the cryptographic key storing part 142. In addition, the cryptographic communicating part 144 encrypts the communication condition registration request received from the communication condition registering part 146 by using the read first key and transmits the encrypted communication condition registration request to the communication support server 20 through the communication network 12 (Step S218). Then, the communication data processing part 152 repeats the process shown in Step S200.

In Step S214, if the first key within the term of validity is not stored in the cryptographic key storing part 142 (NO in Step S214), the cryptographic communicating part 144 causes the key sharing part 140 to perform the process of sharing the first key with the communication support server 20 (Step S216) and performs the process shown in Step S218.

Figure 11:
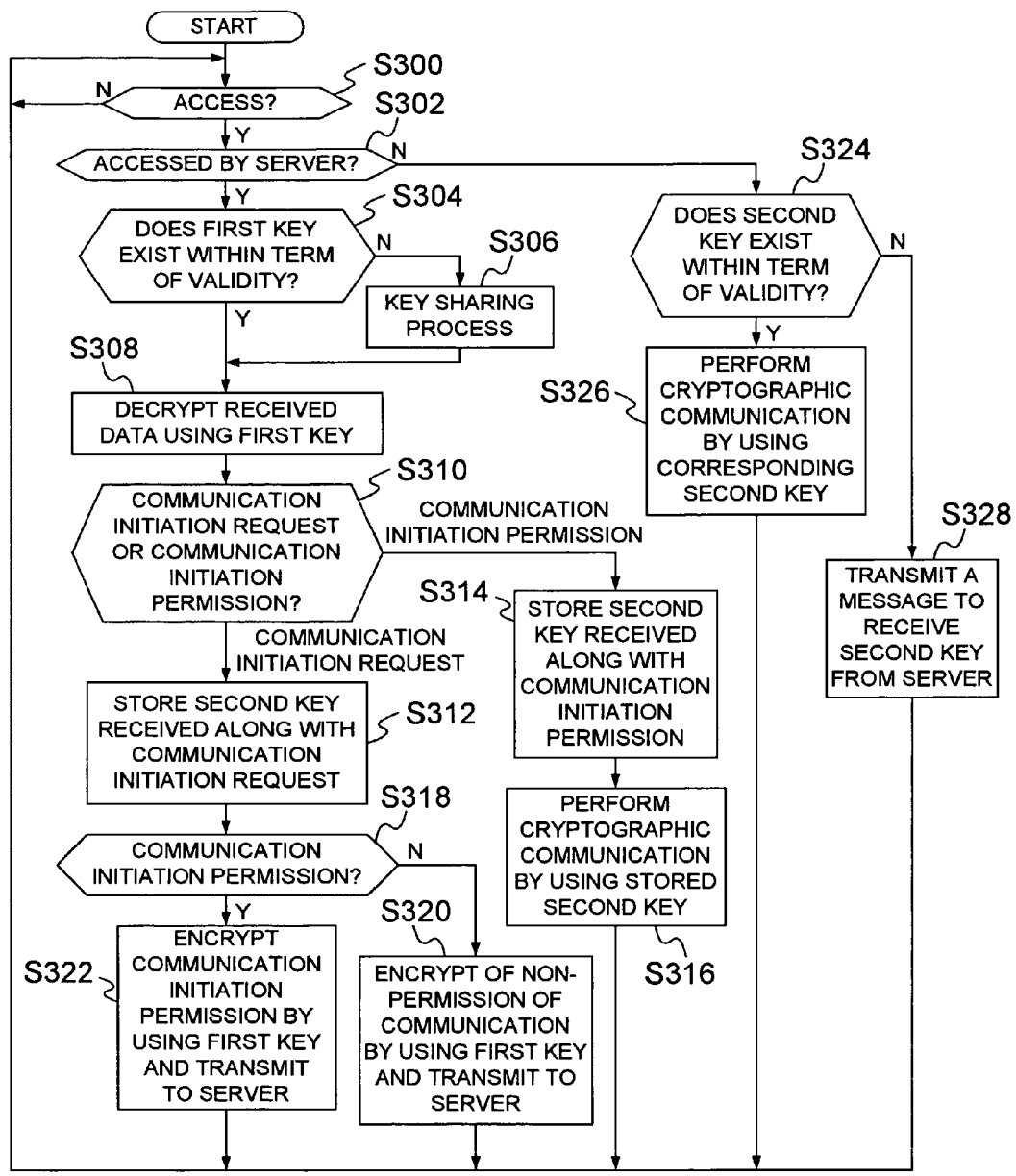
FIG. 11 is a flowchart illustrating an embodiment of operation of the information processing unit 14 when the information processing unit 14 is accessed by the communication support server 20 or other information processing units 14.

FIG. 11 is a flowchart illustrating an embodiment of operation of the information processing unit 14 when the information processing unit 14 is accessed by the communication support server 20 or other information processing units 14. The information processing unit 14 starts a process shown in the flowchart at a predetermined timing such as an input of power. First, the cryptographic communicating part 144 and the cryptographic communicating part 156 determine whether or not they are accessed by the communication support server 20 or any one of the other information processing units 14 (Step S300). If the cryptographic communicating part 144 and the cryptographic communicating part 156 are not accessed by the communication support server 20 or any one of the other information processing units 14 (NO in Step S300), the cryptographic communicating part 144 and the cryptographic communicating part 156 repeat Step S300 until the cryptographic communicating part 144 are accessed by the communication support server 20 or the cryptographic communicating part 156 are accessed by any one of the other information processing units 14.

In Step S300, if the cryptographic communicating part 144 and the cryptographic communicating part 156 are accessed by the communication support server 20 or any one of the other information processing units 14 (YES in Step S300), the cryptographic communicating part 144 determine whether or not the access is made by the communication support server 20 (Step S302). If the access is made by any one of the other information processing units 14, not the communication support server 20 (NO in Step S302), the cryptographic communicating part 156 refers to the cryptographic key storing part 158 based on the identification information of the other information processing units 14, which is received from the other information processing units 14 along with the communication data through the communication network 12, and determines whether or not the second key within the term of validity is stored in the cryptographic key storing part 158 in correspondence to the identification information (Step S324). If the second key within the term of validity is stored in the cryptographic key storing part 158 in correspondence to the identification information (YES in Step S324), the cryptographic communicating part 156 reads the corresponding second key from the cryptographic key storing part 158. In addition, the cryptographic communicating part 156 decrypts the communication data received from the other information processing units 14 by using the read second key and transmits the decrypted communication data to the communication data processing part 152, while encrypting communication data, if there exists the communication data transmitted by the communication data processing part 152 according to the received communication data, then the cryptographic communicating part 156 transmits the encrypted communication data to the information processing unit 14 of the communication counterpart through the communication network 12 (Step S326). Then, the cryptographic communicating part 144 and the cryptographic communicating part 156 repeat the process shown in Step S300.

In Step S324, if the second key within the term of validity is not stored in the cryptographic key storing part 158 in correspondence to the identification information (NO in Step S324), the cryptographic communicating part 156 informs the accessing other information processing units 14 that there is a need for the accessing other information processing units 14 to receive the second key from the communication support server 20 (Step S328). Then, the cryptographic communicating part 144 and the cryptographic communicating part 156 repeat the process shown in Step S300.

In Step S302, if the access is made by the communication support server 20 (YES in Step S302), the cryptographic communicating part 144 determines whether or not the first key within the term of validity is stored in the cryptographic key storing part 142 (Step S304). If the first key within the term of validity is stored in the cryptographic key storing part 142 (YES in Step S304), the cryptographic communicating part 144 reads the first key from the cryptographic key storing part 142. In addition, the cryptographic communicating part 144 decrypts the data received from the communication support server 20 by using the read first key (Step S308). If the first key within the term of validity is not stored in the cryptographic key storing part 142 (NO in Step S304), the cryptographic communicating part 144 executes the key sharing part 140 to perform the process of sharing the first key with the communication support server 20 (Step S306) and performs the process shown in Step S308.

Step S306 is an exceptional process. For example, the step may be created by deviation of an internal clock between the communication support server 20 and the information processing unit 14.

Next, the cryptographic key receiving part 154 determines whether the communication data received from the communication support server 20 is data representing the communication initiation request or data representing the communication initiation permission transmitted through the communication support server 20 in response to the communication initiation request (Step S310). If the received communication data is data representing the communication initiation request (communication initiation request in Step S310), the cryptographic key receiving part 154 transmits the received communication initiation request to the communication data processing part 152. In addition, the cryptographic key receiving part 154 stores the second key, the common communication condition, and the term of validity of the second key, which are received along with the communication initiation request, in the cryptographic key storing part 158 in correspondence to the identification information of the information processing unit 14 that transmits the communication initiation request (Step S312).

Next, the communication data processing part 152 determines whether or not it communicates with the information processing unit 14 that transmits the communication initiation request (Step S318). If the communication data processing part 152 communicates with the information processing unit 14 that transmits the communication initiation request (YES in Step S318), the communication data processing part 152 causes the communication initiation request transmitting part 150 to transmit the communication initiation permission to the communication support server 20 through the cryptographic communicating part 144 (Step S322). Then, the cryptographic communicating part 144 and the cryptographic communicating part 156 repeat the process shown in Step S300. In Step S322, the cryptographic communicating part 144 encrypts the communication initiation permission by using the first key stored in the cryptographic key storing part 142 and transmits the encrypted communication initiation permission to the communication support server 20 through the communication network 12.

In Step S318, if the communication data processing part 152 does not communicate with the information processing unit 14 that transmits the communication initiation request (NO in Step S318), the communication data processing part 152 causes the communication initiation request transmitting part 150 to inform the communication support server 20, through the cryptographic communicating part 144, that the communication initiation is not permitted (Step S320). Then, the cryptographic communicating part 144 and the cryptographic communicating part 156 repeat the process shown in Step S300.

In Step S310, if the received communication data is data representing the communication initiation permission (communication initiation permission in Step S310), the cryptographic key receiving part 154 transmits the received communication initiation permission to the communication data processing part 152. In addition, the cryptographic key receiving part 154 stores the second key and the term of validity of the second key, which are received along with the communication initiation permission, in the cryptographic key storing part 158 in correspondence to the identification information of the information processing unit 14 that transmits the communication initiation permission (Step S314). Then, the cryptographic communicating part 156 reads the second key, which is received along with the communication initiation permission, from the cryptographic key storing part 158. In addition, the cryptographic communicating part 156 encrypts the communication data created by the communication data processing part 152 by using the read second key and transmits the encrypted communication data to a different information processing unit 14, while decrypting the communication data received from the different information processing unit 14 through the communication network 12 and transmitting the decrypted communication data to the communication data processing part 152 (Step S316). Then, the cryptographic communicating part 144 and the cryptographic communicating part 156 repeat the process shown in Step S300.

Here, relationship among the processes shown in FIGS. 9, 10 and 11 may be arranged as follows.

When the second key within the term of validity corresponding to the information processing unit 14 of the communication counterpart is used between the information processing units 14 performing the cryptographic communication, the information processing unit 14 of a transmitting side encrypts the communication data by using the second key and transmits the encrypted communication data to the information processing unit 14 of the communication counterpart in Step S204 of FIG. 10. In Step S326 of FIG. 11, the cryptographic communicating part 156 decrypts the data received by the information processing unit 14 of a receiving side by using the second key. Thereafter, the two information processing units 14 perform the cryptographic communication by using the corresponding second key.

In addition, when the information processing unit 14 having the first key within the term of validity registers the communication condition in the communication support server 20, the information processing unit 14 encrypts the communication condition by using the first key and transmits the encrypted communication condition to the communication support server 20 in Step S218 of FIG. 10. When receiving the encrypted communication condition, the communication support server 20 stores the received communication condition in the communication condition storing part 204 in Step S112 of FIG. 9.

In addition, when the information processing units 14 performing the cryptographic communication have no second key within the term of validity corresponding to the information processing unit 14 of the communication counterpart and no first key within the term of validity, the information processing unit 14 of the transmitting side performs the process of sharing the first key with the communication support server 20 in Step S208 of FIG. 10. At this time, the communication support server 20 performs the process of sharing the first key with an accessing information processing unit 14 in Step S104 of FIG. 9.

Thereafter, the information processing unit 14 of the transmitting side encrypts the communication initiation request by using the first key shared with the communication support server 20 and transmits the encrypted communication initiation request to the communication support server 20 in Step S210 of FIG. 10. When receiving the encrypted communication condition, the communication support server 20 creates the second key based on the communication condition of the two information processing units 14 performing the cryptographic communication in Steps S118 and S120 of FIG. 9.

In addition, the communication support server 20 performs the process of sharing the first key with the information processing unit 14 of the receiving side in Step S124 of FIG. 9. At this time, the information processing unit 14 of the receiving side performs the process of sharing the first key with the communication support server 20 in Step S306 of FIG. 11.

In addition, in Step S126 of FIG. 9, the communication support server 20 encrypts the communication initiation request, the second key and so on by using the shared first key and transmits the encrypted communication initiation request and so on to the information processing unit 14 of the receiving side. At this time, the information processing unit 14 of the receiving side stores the second key and so on, which are received along with the communication initiation request, in Step S312 of FIG. 11, and encrypts the communication permission by using the first key and transmits the encrypted communication permission to the communication support server 20 in Step S322 of FIG. 11. When receiving the encrypted communication permission, the communication support server 20 encrypts the communication initiation permission, the second key and so on by using the first key in Steps S116 of FIG. 9, and transmits the encrypted communication initiation permission and so on to the information processing unit 14 of the transmitting side. When receiving the encrypted communication initiation permission and so on, the information processing unit 14 of the transmitting side stores the second key and so on, which are received along with the communication initiation permission, and performs the cryptographic communication with the information processing unit 14 of the receiving side by using the stored second key in Steps S314 and S316 of FIG. 11.

Figure 12:
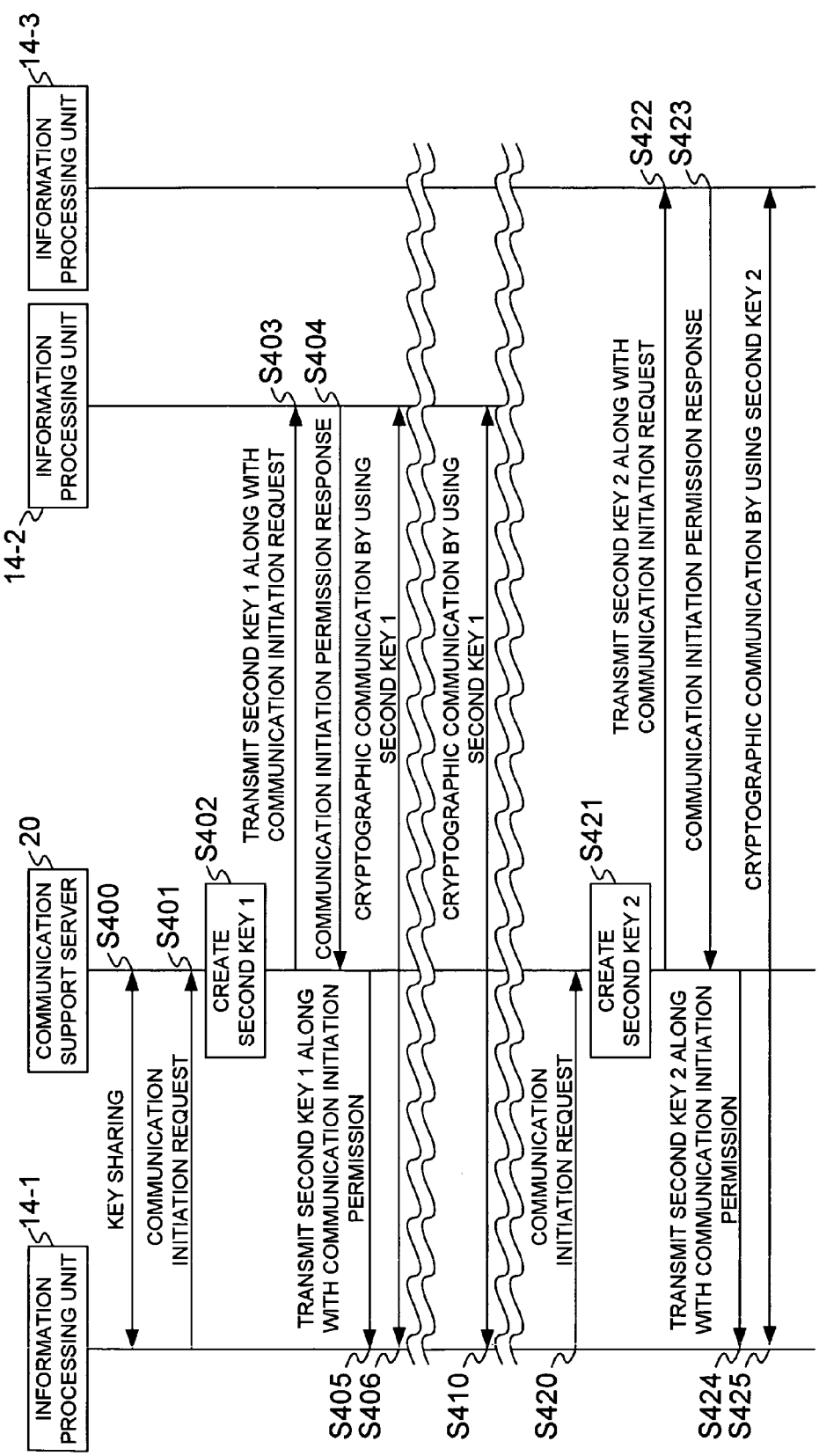
FIG. 12 is a sequence diagram illustrating operation of one of the information processing units 14 performing communication with a plurality of other information processing units 14.

FIG. 12 is a sequence diagram illustrating operation of communication with a plurality of information processing units 14 within the term of validity of the first key. In FIG. 12, it is assumed that communication conditions of information processing units 14 are registered in advance in the communication support server 20. Prior to cryptographic communication with an information processing unit 14-2, an information processing unit 14-1 performs a process of sharing the first key to be used for cryptographic communication with the communication support server 20 (Step S400). In addition, the information processing unit 14-1 transmits a communication initiation request, assuming identification information of the information processing unit 14-2 as identification information of a communication counterpart, to the communication support server 20 (Step S401).

Next, the communication support server 20 extracts a communication condition common to the information processing units 14-1 and 14-2 based on the identification information of the information processing units 14-1 and 14-2, which is included in the received communication initiation request. Then, the communication support server 20 creates the second key to be used for cryptographic communication between the information processing unit 14-1 and the information processing unit 14-2 based on the extracted common communication condition (Step S402). In addition, the communication support server 20 transmits the created second key and the common communication condition used to create the second key, along with the communication initiation request, to the information processing unit 14-2 (Step S403). In this case, if there is no first key within the term of validity between the communication support server 20 and the information processing unit 14-2, a first key sharing process shown in Step S400 is performed between the communication support server 20 and the information processing unit 14-2.

Next, the information processing unit 14-2 responds to the communication support server 20 with the communication initiation permission according to the communication initiation request (Step S404). In addition, the communication support server 20 transmits the communication initiation permission received from the information processing unit 14-2, along with the created second key and the common communication condition, to the information processing unit 14-1 (Step S405). Then, the information processing unit 14-1 and the information processing unit 14-2 can perform the cryptographic communication using the second key and the common communication conditions, which are distributed from the communication support server 20 (Step S406).

In Step S402, the communication support server 20 creates the second key and the term of validity, which is the term for which the second key can continue to be used, and distributes the created term of validity, along with the second key and the common communication condition, to the information processing units 14-1 and 14-2, respectively. Accordingly, the information processing unit 14-1 and the information processing units 14-2 can perform the cryptographic communication by using the second key at any time within the term of validity, as shown in Step S410.

In addition, in Step S400, the first key shared by the information processing unit 14-1 and the communication support server 20 has its own term of validity, and the information processing unit 14-1 and the communication support server 20 can continue to use the first key shared in Step S400 at any time within the term of validity. Accordingly, for example, when the information processing unit 14-1 performs cryptographic communication with an information processing unit 14-3, if the first key shared in Step S400 is within the term of validity, the information processing unit 14-1 omits a process of sharing a key with the communication support server 20 and can initiate a process starting from the step of encrypting the communication initiation request to the information processing unit 14-3 by using the first key shared in Step S400 and transmitting the encrypted communication initiation request to the communication support server 20 (Step S420).

According to the above-described operation, when cryptographic communication is performed between a plurality of different information processing units 14, an information processing unit 14 has only to perform a process of sharing the first key with the communication support server 20 with no need to perform a process of sharing the second key with different information processing units 14. In addition, the information processing unit 14 can omit a first sharing process if there exists the first key within the term of validity. Accordingly, the information processing unit 14 can realize a so-called single sign-on system in which the information processing unit 14 can initiate communication with different information processing units 14 more quickly without performing the first key sharing process if there exists the first key within the term of validity, once after the information processing unit 14 performs the process of sharing the first key with the communication support server 20.

Figure 13:
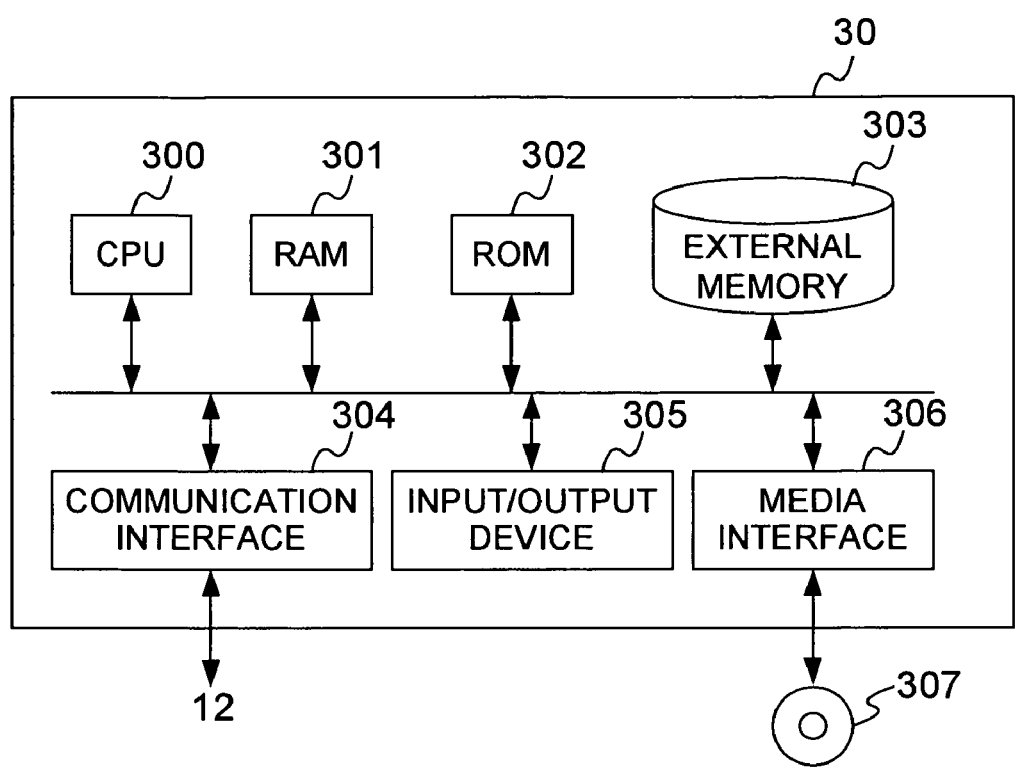
FIG. 13 is a diagram illustrating an exemplary hardware configuration of an electronic data processing system 30 that can implement the communication support server 20 or the information processing unit 14.

FIG. 13 is a diagram illustrating an exemplary hardware configuration of an electronic data processing system 30 that can implement the communication support server 20 or the information processing unit 14. The electronic data processing system 30 includes a CPU 300, a RAM 301, a ROM 302, an external memory 303, a communication interface 304, an input/output device 305, and a media interface 306.

The CPU 300 operates based on a program stored in the RAM 301 and the ROM 302 and controls parts in the electronic data processing system 30. The ROM 302 and the external memory 303 store a boot program executed by the CPU 300 when the electronic data processing system 30 starts or a program relying on hardware of the electronic data processing system 30. The RAM 301 stores programs to be executed by the CPU 300, data to be used by the CPU 300, etc.

The communication interface 304 provides programs and/or data, which are received from different electronic data processing systems 30 through the communication network 12, to the RAM 301 or the external memory 303 or transmits the programs and/or data to the CPU 300. In addition, the communication interface 304 transmits data created by the CPU 300 to the different electronic data processing systems 30. The input/output device 305 receives data from a manager or user of the electronic data processing systems 30, transmits the received data to the CPU 300, and informs the manager or user of the data created by the CPU 300. The media interface 306 reads programs and/or data from a recording medium 307, and the media interface 306 provides the read program and/or data to the RAM 301 or the external memory 303.

The programs may be stored in advance in the ROM 302 or the external memory 303. Alternatively, if necessary, the programs may be read from the recording medium 307 through the media interface 306, and then stored in the ROM 302 or the external memory 303, or the programs may be stored in the ROM 302 or the external memory 303 through the communication interface 304 and a communication medium.

When the electronic data processing systems 30 operates as the communication support server 20, a program installed and executed in the electronic data processing systems 30 causes the electronic data processing systems 30 to function as the cryptographic key storing part 200, the key sharing part 202, the communication condition storing part 204, the communication condition receiving part 206, the cryptographic communicating part 208, the communication initiation request receiving part 210, the communication condition extracting part 212, the key distribution controlling part 214, and the key information creating part 216.

In addition, when the electronic data processing systems 30 operates as the information processing unit 14, a program installed and executed in the electronic data processing systems 30 causes the electronic data processing systems 30 to function as the key sharing part 140, the cryptographic key storing part 142, the cryptographic communicating part 144, the communication condition registering part 146, the communication condition storing part 148, the communication initiation request transmitting part 150, the communication data processing part 152, the cryptographic key receiving part 154, the cryptographic communicating part 156, and the cryptographic key storing part 158.

The recording medium 307 may be an optical recording medium such as a DVD and PD, a magneto optical recording medium such as a MD, a tape medium, a magnetic recording medium, or a semiconductor recording device, for example. In addition, the communication medium may be a cable, a carrier wave, or a digital signal, for example.

Although specific embodiments of the present invention is described and illustrated above, the scope of the invention is not limited by the above exemplary embodiments. It is apparent to those skilled in the art that the above exemplary embodiments may be modified and improved in various ways. It is apparent from the annexed claims that such a modification and improvement is also included in the scope of the invention.

For example, Each of a plurality of functional blocks of the communication support server 20 and the information processing unit 14 may be implemented in a hardware manner by an integrated logic IC such as an application specific integrated circuit (ASIC) or a field programmable gate array (FPGA) or may be implemented in a software manner by a digital signal processor (DSP) or a general-purpose data processing system.

In addition, although the communication conditions of the information processing units 14, which are stored in the communication condition storing part 204, are registered from the information processing units 14 through the communication network 12 in the above embodiments, alternatively the communication conditions of the information processing units 14 may be registered in advance in the communication condition storing part 204.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A communication support server device for providing key support for supporting cryptographic communication between communication terminals including a first information processing unit, a second information processing unit and a third information processing unit, comprising:

a communication condition storing part which stores communication conditions of the cryptographic communication performed by the communication terminals, in correspondence to identification information of the communication terminals, with respect to each of the communication terminals;

a key sharing part which:

executes a first authentication process together with the first information processing unit, and, when the first authentication process is successfully executed, creates a first key for key sharing to be used for the cryptographic communication between the communication support server device and the first information processing unit according to the success of the first authentication process, transmits the first key for key sharing thus created to the first information processing unit, and further stores the first key for key sharing thus created in a cryptographic key storing part in the communication support server device;

executes a second authentication process together with the second information processing unit, and, when the second authentication process is successfully executed, creates a second key for key sharing to be used for the cryptographic communication between the communication support server device and the second information processing unit according to the success of the second authentication process, transmits the second key for key sharing thus created to the second information processing unit, and further stores the second key for key sharing thus created in the cryptographic key storing part in the communication support server device; and executes a third authentication process together with the third information processing unit, and, when the third authentication process is successfully executed, creates a third key for key sharing to be used for the cryptographic communication between the communication support server device and the third information processing unit according to the success of the third authentication process, transmits the third key for key sharing thus created to the third information processing unit, and further stores the third key for key sharing thus created in the cryptographic key storing part in the communication support server device;

a first key storing part which stores the first, second and third key, which is shared by the key sharing part and the first, second and third information processing units, respectively, along with a term of validity corresponding to the first, second and third key, respectively, in correspondence to the identification information of the communication terminals;

a cryptographic communicating part which performs the cryptographic communication with any of the first, second and third information processing units having the identification information corresponding to the first, second and third key, by using the first, second and third key, respectively;

a common communication condition extracting part which refers to the communication condition storing part by using the identification information of two communication terminals selected from the first, second and third information processing units as set forth in a communication initiation request received from one of the first, second and third information processing units through the cryptographic communicating part, and extracts a common communication condition which is common to the two communication terminals; and a second key information creating part which creates second key information according to the extracted common communication condition and transmits the created second key information with the common communication condition to each of the two communication terminals through the cryptographic communicating part.

2. A communication system comprising a server device, a first information processing unit, a second information processing unit, and a third information processing unit, wherein:

the server device provides key support to enable cryptographic communication between the first information processing unit and the second or the third information processing units without the server device;

a key sharing part in the server device, which:

executes a first authentication process together with the first information processing unit, and, when the first authentication process is successfully executed, creates a first key for key sharing to be used for the cryptographic communication between the server device and the first information processing unit according to the success of the first authentication process, transmits the first key for key sharing thus created to the first information processing, unit, and further stores the first key for key sharing thus created in a cryptographic key storing part in the server device;

executes a second authentication process together with the second information processing unit, and, when the second authentication process is successfully executed, creates a second key for key sharing to be used for the cryptographic communication between the server device and the second information processing unit according to the success of the second authentication process, transmits the second key for key sharing thus created to the second information processing unit, and further stores the second key for key sharing thus created in the cryptographic key storing part in the server device; and executes a third authentication process together with the third information processing unit, and, when the third authentication process is successfully executed, creates a third key for key sharing to be used for the cryptographic communication between the server device and the third information processing unit according to the success of the third authentication process, transmits the third key for key sharing thus created to the third information processing unit, and further stores the third key for key sharing thus created in the cryptographic key storing part in the server device;

a key sharing part in the first information processing unit which stores the first key for key sharing in a cryptographic key storing part in the first information processing unit;

when a communication initiation requesting part in the first information processing unit requests key support from the server device for communication with the second information processing unit as a communication counterpart, a cryptographic communicating part in the first information processing unit encrypts a request for first-communication initiation for key support for communication between the first information processing unit and the second information processing unit, by using the first key for key sharing, if the first key for key sharing stored in the cryptographic key storing part in the first information processing unit is usable;

the cryptographic communicating part in the first information processing unit transmits the encrypted request for first-communication initiation to the server device as a first communication data;

a cryptographic communicating part in the server device which receives the first communication data, and performs operations where:

if the first key for key sharing stored in the cryptographic key storing part in the server device according to the success of the first authentication process is usable, the cryptographic communicating part in the server device decrypts the first communication data thus received by using the first key for key sharing;

if a result of decrypting the first communication data is the request for the first-communication initiation for key support for communication between the first information processing unit and the second information processing unit, and if the second key for key sharing stored in the cryptographic key storing part in the server device is usable, the cryptographic communicating part in the server device executes a first connection process which extracts a first common communication condition which is common to the first information processing unit and the second information processing unit, from first communication conditions which are supported by the first information processing unit and second communication conditions which are supported by the second information processing unit, creates a first-connection key for data encryption to be used for cryptographic communication in accordance with the first common communication condition, and further creates a term of validity of the first-connection key for data encryption according to the request for the first-communication initiation;

when the communication initiation requesting part in the first information processing unit requests the server device for key support for communication with the third information processing unit being different from the second information processing unit, the cryptographic communicating part in the first information processing unit encrypts a request for second-communication initiation for key support for communication between the first information processing unit and the third information processing unit, by using the first key for key sharing, if the first key for key sharing received from the server device stored in the cryptographic key storing part in the first information processing unit is usable;

the cryptographic communicating part in the first information processing unit transmits the encrypted request for the second-communication initiation to the server device as a second communication data;

the cryptographic communicating part in the server device receives the second communication data, and performs operations where:

if the first key for key sharing stored in the cryptographic key storing part in the server device according to the success of the first authentication process is usable, the cryptographic communicating part in the server device decrypts the second communication data by using the first key for key sharing; and if a result of decrypting the second communication data is the request for second-communication initiation for key support for communication between the first information processing unit and the third information processing unit, and if the third key for key sharing stored in the cryptographic key storing part in the server device is usable, the cryptographic communicating part in the server device executes a second connection process which extracts a second common communication condition which is common to the first information processing unit and the third information processing unit, from the first communication conditions and third communication conditions which are supported by the third information processing unit, creates a second-connection key for encryption to be used by the first and third information processing units for cryptographic communication in accordance with the second common communication condition, and further creates a term of validity of the second-connection key for encryption according to the request for the second-communication initiation.

3. A communication system according to claim 2, wherein:

the cryptographic communicating part in the server device in the first connection process:
encrypts the request for the first-communication initiation by using the second key for key sharing stored in the cryptographic key storing part in the server device;
transmits the encrypted request for the first-communication initiation to the second information processing unit as a third communication data;

a cryptographic communicating part in the second information processing unit:

receives the third communication data;
decrypts the third communication data thus received by using the second key for key sharing if the second key for key sharing stored in the cryptographic key storing part in the second information processing unit according to the success of the second authentication process, is usable;
if the decrypted third communication data is the request for first-communication initiation, encrypts a response for communication initiation from the second information processing unit to the first information processing unit created by a communication data processing part of the second information processing unit indicating whether or not permitting communication to the first-communication initiation request by using the second key for key sharing stored in the cryptographic key storing part in the second information processing unit; and
transmits the encrypted response for first-communication initiation to the server device as a fourth communication data;

the cryptographic communicating part in the server device in the first connection process further:
receives the fourth communication data;
decrypts the fourth communication data thus received by using the second key for key sharing stored in the cryptographic key storing part in the server device;
if the decrypted fourth communication data is a response for the first-communication initiation, encrypts the response for the first-communication initiation by using the first key stored in the cryptographic key storing part in the server device;
transmits the encrypted response for the first-communication initiation to the first information processing unit as a fifth communication data;

the cryptographic communicating part in the first information processing unit:
receives the fifth communication data;
decrypts the fifth communication data thus received by using the first key for key sharing and obtains the response for the first-communication initiation; and the cryptographic communicating part in the server device in the second connection process:
encrypts the request for second-communication initiation by using the third key for key sharing stored in the cryptographic key storing part in the server device;
transmits the encrypted request for second-communication initiation to the third information processing unit as a sixth communication data; and a cryptographic communicating part in the third information processing unit:
receives the sixth communication data;
decrypts the sixth communication data thus received by using the third key for key sharing if the third key for key sharing stored in the cryptographic key storing part in the third information processing unit is usable;
if the decrypted sixth communication data is the request for the second-communication initiation, encrypts a response for the second-communication initiation created by a communication data processing part of the third information processing unit indicating whether or not permitting communication to the second-communication initiation request, by using the third key for key sharing stored in the cryptographic key storing part in the third information processing unit; and
transmits the encrypted response for second-communication initiation to the server device as a seventh communication data; and the cryptographic communicating part in the server device in the second connection process further:

receives the seventh communication data;
decrypts the seventh communication data thus received by using the third key for key sharing stored in the cryptographic key storing part in the server device;
if the decrypted seventh communication data is the response for second-communication initiation, encrypts the response for the second-communication initiation by using the first key for key sharing stored in the cryptographic key storing part in the server device;
transmits the encrypted response for the second-communication initiation to the first information processing unit as an eighth communication data; and the cryptographic communicating part in the first information processing unit;
receives the eighth communication data; and
decrypts the eighth communication data thus received by using the first key for key sharing stored in the cryptographic key storing part and obtains the response for second-communication initiation.

4. A communication system according to claim 3, wherein:
the third communication data is encrypted to further include the first-connection key for data encryption to be used for cryptographic communication between the first information processing unit and the second information processing unit;
if a response for the first-communication initiation indicates communication permission, the fifth communication data is encrypted to further include the first-connection key for data encryption;
the sixth communication data is encrypted to further include the second-connection key for data encryption to be used for cryptographic communication between the first information processing unit and the third information processing unit;
if a response for the second communication initiation indicates communication permission, the eighth communication data is encrypted to further include the second-connection key for data encryption;
the cryptographic communicating part in the first information processing unit obtains the first-connection key for data encryption and stores the first-connection key for data encryption thus obtained in the cryptographic key storing part in the first information processing unit if the first-connection key for data encryption is included when decrypting the fifth communication data, and obtains the second-connection key for data encryption and stores the second-connection key for data encryption thus obtained in the cryptographic key storing part in the first information processing unit if the second-connection key for data encryption is included when decrypting the eighth communication data;
the cryptographic communicating part in the second information processing unit obtains the first-connection key for data encryption and stores the first-connection key for data encryption thus obtained in the cryptographic key storing part in the second information processing unit when decrypting the third communication data;
the cryptographic communicating part in the third information processing unit obtains the second-connection key for data encryption and stores the second-connection key for data encryption thus obtained in the cryptographic key storing part in the third information processing unit when decrypting the sixth communication data;
the cryptographic communicating part in the first information processing unit and the cryptographic communicating part in the second information processing unit perform cryptographic communication by using the first-connection key for data encryption; and
the cryptographic communicating part in the first information processing unit and the cryptographic communicating part in the third information processing unit perform cryptographic communication by Using the second-connection key for data encryption.

5. A communication system according to claim 4, wherein:
the first-connection key for data encryption is created by a key information creating part of the server device in the first connection process; and
the second-connection key for data encryption is created by the key information creating part in the second connection process.

6. A communication system according to claim 2, wherein:
each of the keys for key sharing are set in correspondence to a term of validity;
the cryptographic communicating parts in each unit of the first information processing unit, the second information processing unit, the third information processing unit, and the server device, determine that the keys for key sharing are usable if the keys for key sharing are stored in the cryptographic key storing part of said each unit and if it is before expiration of the term of validity corresponding to the keys for key sharing.

7. A communication system according to claim 6, wherein:
a key sharing part of said each unit of the first information processing unit, the second information processing unit, or the third information processing unit, or the server device further executes new authentication process if it is after expiration of the term of validity corresponding to the key for key sharing stored in the cryptographic key storing part of said each unit;
the server device creates, when the new authentication process is successfully executed, a new key for key sharing, transmits the new key for key sharing thus created to the information processing unit which executed the new authentication process, and further stores the new key for key sharing thus created in the cryptographic key storing part in the server device; and
the key sharing part of the information processing unit which received the new key for key sharing stores the new key for key sharing in the cryptographic key storing part of the information processing unit which received the new key.

8. A communication system according to claim 7, wherein:
a key sharing part of said each unit of the first information processing unit, the second information processing unit, or the third information processing unit, or the server device, further executes a new authentication process if the key for key sharing is not stored in the cryptographic key storing part of said each unit;
the server device creates, when the new authentication process is successfully executed, the new key for key sharing, transmits the new key for key sharing thus created to the information processing unit which executed the new authentication process, and further stores the new key for key sharing thus created in the cryptographic key storing part in the server device; and
the key sharing part of the information processing unit which received the new key for key sharing stores the new key for key sharing in the cryptographic key storing part of the information processing unit which received the new key.

* * * * *